(12) United States Patent
Masselle et al.

(10) Patent No.: US 9,003,396 B2
(45) Date of Patent: Apr. 7, 2015

(54) FILE MANAGER INTEGRATION OF UNINSTALLATION FEATURE

(75) Inventors: Eric L. Masselle, Raleigh, NC (US); William G. Pagan, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1620 days.

(21) Appl. No.: 11/424,955

(22) Filed: Jun. 19, 2006

(65) Prior Publication Data

US 2007/0294687 A1 Dec. 20, 2007

(51) Int. Cl.
G06F 9/44 (2006.01)
G06F 9/445 (2006.01)
G06F 17/30 (2006.01)

(52) U.S. Cl.
CPC ........................ G06F 8/62 (2013.01)

(58) Field of Classification Search
None
See application file for complete search history.

(56) References Cited

U.S. PATENT DOCUMENTS

| | | | | |
|---|---|---|---|---|
| 5,745,766 A * | 4/1998 | Bramnick et al. | ............ | 717/177 |
| 5,768,566 A * | 6/1998 | Harikrishnan et al. | ........ | 717/170 |
| 5,930,514 A * | 7/1999 | Thompson et al. | ............ | 717/170 |
| 5,937,406 A * | 8/1999 | Balabine et al. | ........................ | 1/1 |
| 6,002,402 A * | 12/1999 | Schacher | ....................... | 715/810 |
| 6,020,885 A * | 2/2000 | Honda | ............................ | 715/757 |
| 6,161,111 A * | 12/2000 | Mutalik et al. | ......................... | 1/1 |
| 6,289,512 B1 * | 9/2001 | Edwards et al. | ............... | 717/178 |
| 6,374,401 B1 * | 4/2002 | Curtis | ............................ | 717/175 |
| 6,442,548 B1 * | 8/2002 | Balabine et al. | ........................ | 1/1 |
| 6,507,948 B1 | 1/2003 | Curtis et al. | | |
| 6,631,521 B1 * | 10/2003 | Curtis | ............................ | 717/175 |
| 6,889,376 B1 * | 5/2005 | Barritz et al. | ................... | 717/175 |
| 6,904,424 B1 * | 6/2005 | Gusler et al. | ............................ | 1/1 |
| 6,948,166 B2 * | 9/2005 | Barfield et al. | ................ | 717/174 |
| 6,981,252 B1 * | 12/2005 | Sadowsky | ....................... | 717/176 |
| 7,016,920 B2 * | 3/2006 | Mastrianni et al. | .................... | 1/1 |
| 7,162,628 B2 * | 1/2007 | Gentil et al. | ..................... | 713/100 |
| 7,181,739 B1 * | 2/2007 | Harral et al. | ................... | 717/176 |
| 7,185,335 B2 * | 2/2007 | Hind et al. | ...................... | 717/176 |
| 7,222,341 B2 * | 5/2007 | Forbes et al. | .................. | 717/170 |
| 7,246,139 B2 * | 7/2007 | Andoh | ................. | 1/1 |
| 7,278,133 B2 * | 10/2007 | Roman et al. | .................. | 717/120 |
| 7,284,203 B1 * | 10/2007 | Meeks et al. | .................. | 715/751 |
| 7,496,913 B2 * | 2/2009 | Hayes et al. | ................... | 717/174 |

(Continued)

OTHER PUBLICATIONS

"File System" definition from Microsoft Press Computer Dictionary 3rd edition, published 1997, ISBN 1-57231-446-X, p. No. 196.*

(Continued)

*Primary Examiner* — Tuan Q. Dam
*Assistant Examiner* — Zheng Wei
(74) *Attorney, Agent, or Firm* — Steven M. Greenberg, Esq.; CRGO Law

(57) ABSTRACT

Embodiments of the invention address deficiencies of the art in respect to file removal from a file system and provide a novel and non-obvious method, system and apparatus for file system integration of an un-installation feature. In one embodiment of the invention, an integrated un-installation data processing system can include file associations manager logic coupled to a file system and enabled determine and store file ownership and access data for every file in the file system in a uniform way. For instance, the file associations manager logic can be included as part of the file system and the file ownership and access data can include both an indication of a source application for each file and also an indication of applications accessing each file.

14 Claims, 2 Drawing Sheets

(56) References Cited

U.S. PATENT DOCUMENTS

| | | | |
|---|---|---|---|
| 7,516,442 B2* | 4/2009 | Wu et al. | 717/120 |
| 7,712,079 B2* | 5/2010 | Nakaike et al. | 717/113 |
| 8,584,022 B1* | 11/2013 | O'Shaughnessy et al. | 715/752 |
| 8,806,476 B2* | 8/2014 | Kapoor et al. | 717/175 |
| 2001/0029605 A1* | 10/2001 | Forbes et al. | 717/11 |
| 2001/0029607 A1* | 10/2001 | Veres et al. | 717/11 |
| 2002/0143795 A1* | 10/2002 | Fletcher et al. | 707/200 |
| 2002/0178436 A1* | 11/2002 | Mastrianni et al. | 717/110 |
| 2003/0056192 A1* | 3/2003 | Burgess | 717/100 |
| 2003/0084436 A1* | 5/2003 | Berger et al. | 717/174 |
| 2003/0110241 A1* | 6/2003 | Cheng et al. | 709/221 |
| 2003/0159138 A1* | 8/2003 | Curtis | 717/175 |
| 2003/0217359 A1* | 11/2003 | Ohi et al. | 717/174 |
| 2003/0237021 A1* | 12/2003 | Ching et al. | 714/15 |
| 2004/0015956 A1* | 1/2004 | Barfield et al. | 717/174 |
| 2004/0045000 A1* | 3/2004 | Hara | 717/178 |
| 2004/0060045 A1* | 3/2004 | Hind et al. | 717/174 |
| 2005/0005152 A1* | 1/2005 | Singh et al. | 713/200 |
| 2005/0055360 A1* | 3/2005 | Chang et al. | 707/100 |
| 2005/0172094 A1* | 8/2005 | Goodwin | 711/163 |
| 2005/0240921 A1* | 10/2005 | Barker et al. | 717/175 |
| 2006/0106841 A1* | 5/2006 | Bybee et al. | 707/101 |
| 2006/0129601 A1* | 6/2006 | Chang et al. | 707/104.1 |
| 2006/0259976 A1* | 11/2006 | Thompson et al. | 726/26 |
| 2006/0282834 A1* | 12/2006 | Cheng et al. | 717/174 |
| 2007/0050450 A1* | 3/2007 | Manion et al. | 709/204 |
| 2007/0174832 A1* | 7/2007 | Brehm et al. | 717/174 |
| 2007/0186188 A1* | 8/2007 | Harris | 715/835 |
| 2008/0263511 A1* | 10/2008 | Shapiro | 717/104 |
| 2008/0307367 A1* | 12/2008 | Garrison et al. | 715/853 |
| 2009/0006981 A1* | 1/2009 | Pagan | 715/752 |
| 2009/0158250 A1* | 6/2009 | Kimura et al. | 717/113 |
| 2010/0146493 A1* | 6/2010 | White | 717/140 |
| 2012/0136907 A1* | 5/2012 | Nagpal et al. | 707/822 |
| 2013/0013653 A1* | 1/2013 | Thompson | 707/822 |
| 2013/0179479 A1* | 7/2013 | Chakra et al. | 707/822 |
| 2014/0195570 A1* | 7/2014 | Gandolph et al. | 707/822 |
| 2014/0222876 A1* | 8/2014 | Biskeborn et al. | 707/822 |

OTHER PUBLICATIONS

Rosenblum et al., The Design and Implementation of a Log-Structured File System, published by ACM, 1992, pp. 26-52.*

* cited by examiner

FILE MANAGER INTEGRATION OF UNINSTALLATION FEATURE

BACKGROUND OF THE INVENTION

1. Field of the Invention

The present invention relates to the field of application installation and un-installation in a file system, and more particularly to file identification in an un-installation process.

2. Description of the Related Art

Though often overlooked, application installation is a prerequisite to interacting with a software application. Specifically, in most circumstances, an application can be properly executed only subsequent to the completion of a successful installation process. At the minimum, a typical software application installation requires a transfer of files to the file structure of a computing system, and the configuration of the computing system to particularly interact with the software application. Ordinarily, the configuration of the computing system includes the addition or modification of registry settings, the addition or modification of entries to one or more initialization files, or both.

In contrast to the process of installing an application, uninstalling an application, in an era of complex software applications, requires an equally as sophisticated un-installation process. In that regard, while it can be a simple enough task simply to delete those files from the computing system which are associated with the uninstalled application, in many cases, the files which are to be deleted are requisite to the operation of other applications which are not to be deleted—namely application libraries and such. Also, to the extent that the computing system had been configured for operation with the deleted application, the configuration data ought to be removed from the computing system. Typically, the complete removal of configuration data in the course of an un-installation process will require further editing of the system registry, one or more system initialization files, or both.

For many years, the number of applications and corresponding files installed in a computing device had been limited by available storage capacity. With the advent of windowing operating environment in which the operating system itself consumed vast quantities of disk space, even fewer applications could be installed in a computing device. As such, managing the removal of files from any particular file system could be as simple as readily identifying unnecessary files and deleting them. Notwithstanding, as the storage capacity of personal computing devices has grown, limitations on the number and size of installed applications have evaporated. Today, it is nearly impossible to account for the presence of a given file in a file system.

Specifically, the file system of the modern computing platform can accommodate an enormous quantity of files. As many files can be associated with multiple different installed applications through a shared code base, it can be nearly impossible to determine when a file can be safely removed without giving rise to an unexpected and unintended application failure. Modern operating systems account for the potential consequence of deleting a file relied upon by an application by posting a warning to the end user when the end user indicates the intent to delete a file from the file system that appears to "belong" to an installed application. The warning itself, however, is no more effective than maintaining a common knowledge that an application may rely upon a file destined for deletion.

Conventional installation and un-installation technologies address the file removal problem by tracking the association between different files and an installed application. However, those technologies track files and file associations only through the operation of an installation program during installation of the application and only in the course of removing files through the operation of the installation program during the un-installation of the application. Oftentimes, though, end users prefer the ad hoc removal of a file externally to the use of an installation program.

BRIEF SUMMARY OF THE INVENTION

Embodiments of the invention address deficiencies of the art in respect to file removal from a file system and provide a novel and non-obvious method, system and apparatus for file system integration of an un-installation feature. In one embodiment of the invention, an integrated un-installation data processing system can include file associations manager logic coupled to a file system and enabled determine and store file ownership and access data for every file in the file system in a uniform way. For instance, the file associations manager logic can be included as part of the file system and the file ownership and access data can include both an indication of a source application for each file and also an indication of applications accessing each file.

The system further can include a menu hierarchy provided through a file manager user interface coupled to the file system. The menu hierarchy can provide a sub-menu item enabled to initiate an un-installation process for an application associated with a selected file. In one aspect of the invention, the menu hierarchy can have each of a usage sub-menu item and a source sub-menu item. The usage sub-menu item can relate to menu choices for un-installing accessing applications for the selected file. The source sub-menu item, by comparison, can relate to menu choices for un-installing a source application for the selected file.

In another embodiment of the invention, a method for file system integrated un-installation can be provided. The method can include selecting a file through a file system user interface, identifying a creator application for the selected file, and listing the creator application in a menu view associated with the selected file. The method also can include further identifying other files created by the creator application, and rendering a directory of the other files in the menu view. The even yet further can include identifying accessing applications that have previously accessed the selected file, and rendering a listing of the accessing applications in the menu view.

In one aspect of the embodiment, an un-install sub-menu item can be provided in the menu view. As such, the creator application can be un-installed responsive to an activation of the un-install sub-menu item. In another aspect of the embodiment, one of the accessing applications can be selected and an un-install sub-menu item can be provided in the menu view for the selected one of the accessing applications. Thereafter, the selected one of the accessing applications can be un-installed responsive to an activation of the un-install sub-menu item. Finally, in yet another embodiment, an un-install sub-menu item can be provided in the menu view and the configuration settings for the creator application can be un-installed responsive to an activation of the un-install sub-menu item.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for integrated file system un-installation. In accordance with an embodiment of the present invention, each file in a file system can be associated with a creator application. Thereafter, the file system can provide an interface for viewing the creator application for a given selected file. The file system further can provide an interface for un-installing the creator application for the selected file. In this way, end users can readily identify the source (creator) application of a file and can initiate the un-installation of the source application through a mere selection of the file without further knowledge.

Figure 1:
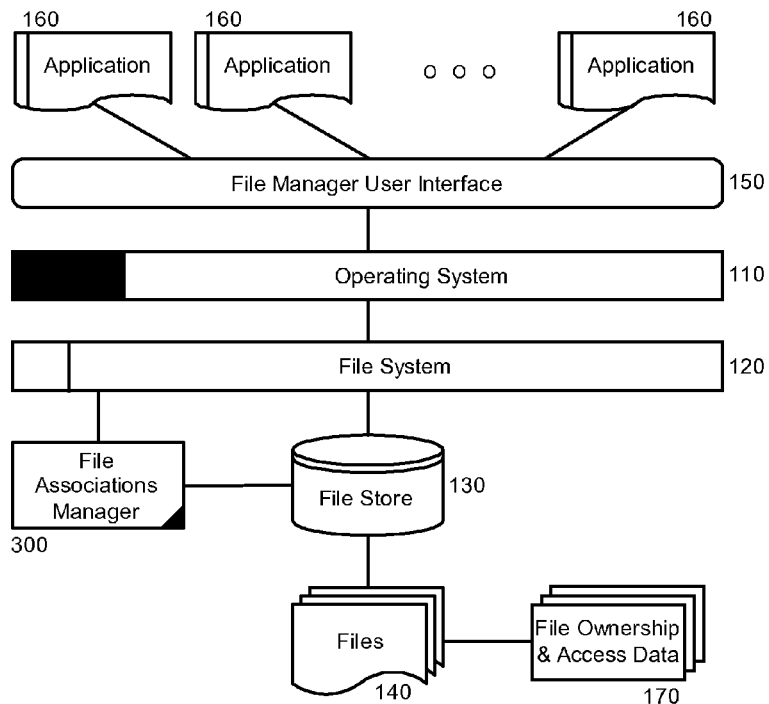
FIG. 1 is a schematic illustration of a data processing system configured for integrated file system un-installation.

In further illustration, FIG. 1 is a schematic illustration of a data processing system configured for integrated file system un-installation. The system can include an operating system 110 coupled to, including or providing an underlying file system 120 governing access to and the creation of files 140 in a file store 130. The file system 120 through the operating system 110, further can provide a file manager user interface 150 for use within one or more applications 160 hosted by the operating system 110. In this regard, the applications 160 not only can include third-party stand-alone logic, but also logic dedicated to the management of files in the file system 120.

A file associations manager 300 can be provided in association with the file system 120. The file associations manager 300 can include program code enabled to manage file ownership and access data 170 for each of the files 140 in the file store 130. In this regard, whenever files 140 are created in the file system 120, the program code of the file associations manager 300 can create associations between the different source ones of the applications 160 requesting the creation of the files 140. Thereafter, whenever accessing ones of the applications 160 access different ones of the files 140, associations can be created as between the applications 160 and the files 140. In both cases, the associations can be created in association with the file system 120 as part of the file ownership and access data 170.

Utilizing the file ownership and access data 170, several uninstallation operations can be provided through the file manager user interface 150. Those operations include not only the uninstallation of an application associated with a selected file, but also the viewing of all associated applications for a selected file, and the source application responsible for the initial creation of a selected file, to name only a few. In further illustration, FIG. 2 is a pictorial illustration of a menu hierarchy configured for use in the file manager user interface 150 and enabled for invoking integrated file system un-installation operations.

Figure 2:
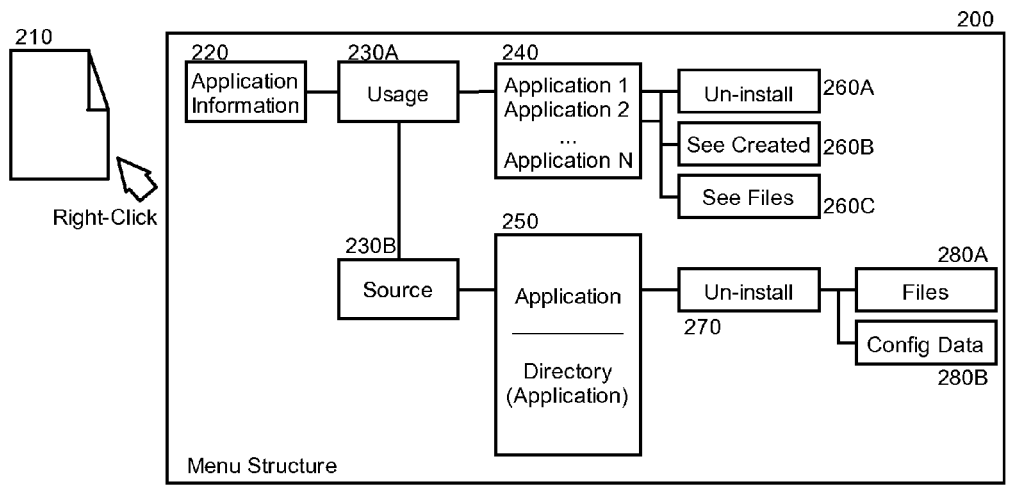
FIG. 2 is a pictorial illustration of a menu hierarchy for invoking integrated file system un-installation operations in the file system of FIG. 1.

The menu structure 200 of FIG. 2 can be activated responsive to the selection of a file or directory 210. The menu structure 200 can include an initial selection of application information 220. The selection of application information 200 can result in two sub-menu items: usage 230A and source 230B. The usage 230A sub-menu item refers to uninstallation operations corresponding to applications that access a selected file or directory. By comparison, the source 230B sub-menu item refers to uninstallation operations corresponding to the application that created the selected file or directory.

Considering first the usage 230A sub-menu item, upon activation, a listing of accessing applications 240 can be provided indicating each application that has accessed the selected file or directory 210. Thereafter, the selection of any one of the listed applications in the listing of accessing applications 240 can result in yet an additional set of sub-menu entries, including un-install 260A, see created 260B and see files 260. The selection of the un-install 260A sub-menu item can result in the initiation of an un-installation operation for the selected application. The selection of the see created 260B sub-menu item in turn can result in a rendering of all files created by the selected application. Finally, the selection of the see files 260C sub-menu item can result in a rendering of all files accessed by the selected application.

Considering next the source 230B sub-menu item, upon activation, a source application listing 250 can be provided. The source application listing can include the source application for the selected file or directory 210, in addition to all other files and directories created by the source application. As in the case of the usage 230A sub-menu item, an un-install 270 sub-menu item can be provided for initiating the un-installation of the source application for the selected file or directory 210. Instead of proceeding directly to the un-installation of the source application, a yet further set of sub-menu items can be provided. The sub-menu items can include an un-install files 280A sub-menu item indicating a desire to un-install the files of the source application, and an un-install configuration data 280B sub-menu item indicating a desire to un-install configuration data for the source application such as one or more associated registry entries.

Figure 3:
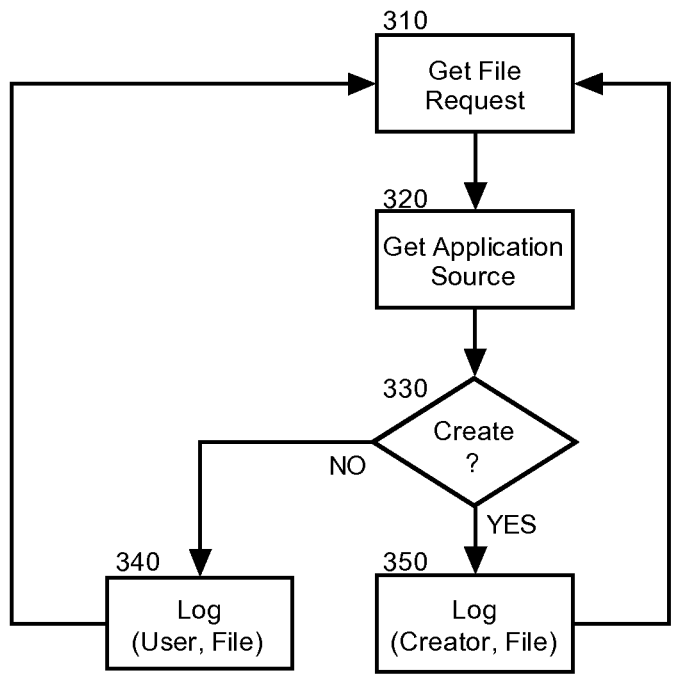
FIG. 3 is a flow chart illustrating a process for configuring the file system of FIG. 1 for integrated un-installation; and, FIG. 4 is a flow chart illustrating a process for invoking integrated file system un-installation operations in the file system of FIG. 1.

Importantly, in order to integrate the un-installation operations of FIG. 2 as virtually or actually part of the file system, file requests must be captured en route to or within the file system and the requisite file associations must be recorded. In more particular illustration, a flow chart is shown in FIG. 3 that illustrates a process for configuring the file system of FIG. 1 for integrated un-installation. Beginning in block 310, a file request can be received from an application source and in block 320, the application source of the request can be determined. In decision block 330, if the file request is one to create the file in the file system, in block 350 the application source can be associated with the file as the creator application or source application. Otherwise, in block 340, the application source can be associated with the file as an accessing application.

Figure 4:
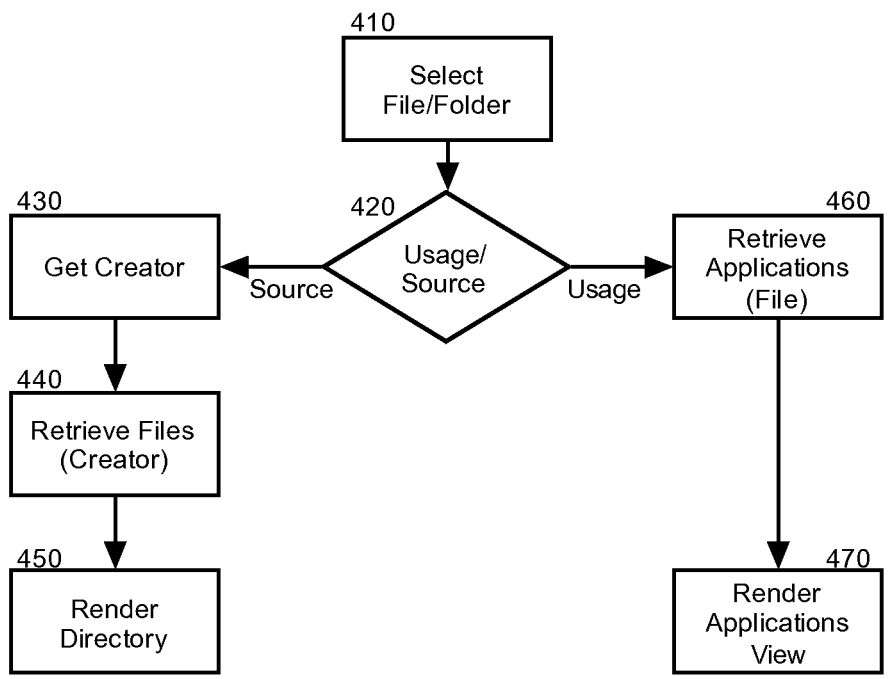

Turning now to FIG. 4, a flow chart illustrating a process for invoking integrated file system un-installation operations in the file system of FIG. 1. Beginning in block 410, a file or a folder can be selected and in decision block 420 it can be determined whether un-installation operations are to be performed on accessing applications, or merely on the creator application. In the event un-installation operations are to be performed on the creator or source application, the process can continue through block 430. Otherwise, the process can continue through block 460.

In block 430, in the event un-installation operations are to be performed on the creator or source application, in block 430 the creator or source application can be determined for the selected file or folder. Thereafter, in block 440 all of the files associated with the creator or source application in a creator/source relationship can be retrieved and in block 450 a directory of the files can be rendered for use in the menu structure of FIG. 2. By comparison, in the event un-installation operations are to be performed on accessing applications, in block 460 all applications having an association with the selected file or folder as accessing applications can be retrieved and in block 470 the applications can be rendered for use in the menu structure of FIG. 2.

In consequence of the foregoing arrangements, the file system in a computing platform can readily provide un-installation functionality in a uniform way that does not require end users to guess as to the file associations for a given application. Moreover, the process of un-installation can become a uniform process throughout, irrespective of the un-installation logic of different applications. Specifically, through the selection of an individual file or folder in a file store, comprehensive un-installation application association information can be provided and entire applications can be uninstalled through a user interface provided by the file system.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An integrated un-installation data processing system comprising:
    a host computing system comprising at least one computer with memory and at least one processor;
    an operating system executing in the host computing system and providing access to a file system managing access to different files stored in fixed storage of the host computing system;
    file associations manager logic coupled to the file system and enabled determine and store file ownership and access data for every file in the file system in a uniform way; and
    a menu structure configured to be activated responsive to a selection of a file in the file system, the selection displaying two different sub-menu items comprising usage and source, the usage sub-menu item providing uninstallation operations corresponding to applications that access the selected file, the source sub-menu item providing uninstallation operations corresponding to an application that created the selected file.

2. The system of claim 1, wherein the file associations manager logic is included as part of the file system.

3. The system of claim 1, wherein the file ownership and access data comprises both an indication of a source application for each file and also an indication of applications accessing each file.

4. The system of claim 1, wherein the menu structure is provided through a file manager user interface coupled to the file system.

5. A method for file system integrated un-installation, comprising:
    selecting a file through a file system user interface;
    identifying a creator application for the selected file;
    listing the creator application in a menu view associated with the selected file;
    identifying a plurality of accessing applications that have previously accessed the selected file;
    rendering a listing of the accessing applications in the menu view; and,
    responding to the selection of an accessing application that had previously accessed the selected file by uninstalling the accessing application.

6. The method of claim 5, further comprising:
    further identifying a plurality of other files created by the creator application; and
    rendering a directory of the other files in the menu view.

7. The method of claim 5, further comprising:
    providing an un-install sub-menu item in the menu view; and
    un-installing the creator application responsive to an activation of the un-install sub-menu item.

8. The method of claim 5, wherein the accessing application is un-installed in response to a selection of the activation of a sub-menu item for the one of the accessing applications displayed in the menu view for the selected one of the accessing applications.

9. The method of claim 5, further comprising:
    providing an un-install sub-menu item in the menu view; and un-installing configuration settings for the creator application responsive to an activation of the un-install sub-menu item.

10. A computer program product comprising a computer usable storage memory having stored therein computer usable program code for file system integrated un-installation, the computer usable program code, which when executed by a computer hardware system, causing the computer hardware system to perform selecting a file through a file system user interface;
identifying a creator application for the selected file;
listing the creator application in a menu view associated with the selected file;
identifying a plurality of accessing applications that have previously accessed the selected file;
rendering a listing of the accessing applications in the menu view; and,
responding to the selection of an accessing application that had previously accessed the selected file by uninstalling the accessing application.

11. The computer program product of claim 10, wherein the computer hardware system is further caused to perform:

identifying a plurality of other files created by the creator application; and
rendering a directory of the other files in the menu view.

12. The computer program product of claim 10, wherein the computer hardware system is further caused to perform:

providing an un-install sub-menu item in the menu view; and
un-installing the creator application responsive to an activation of the un-install sub-menu item.

13. The computer program product of claim 10, wherein the one of the accessing applications is un-installed in response to a selection of the activation of a sub-menu item for the one of the accessing applications displayed in the menu view for the selected one of the accessing applications.

14. The computer program product of claim 10, wherein the computer hardware system is further caused to perform:

providing an un-install sub-menu item in the menu view; and
un-installing configuration settings for the creator application responsive to an activation of the un-install sub-menu item.

* * * * *